(12) United States Patent
Appia

(10) Patent No.: US 11,606,538 B2
(45) Date of Patent: Mar. 14, 2023

(54) AUTOMATIC KEYSTONE CORRECTION IN A PROJECTION SYSTEM

(71) Applicant: Texas Instruments Incorporated, Dallas, TX (US)

(72) Inventor: Vikram VijayanBabu Appia, Dallas, TX (US)

(73) Assignee: Texas Instmments Incorporated, Dallas, TX (US)

( * ) Notice: Subject to any disclaimer, the term of this patent is extended or adjusted under 35 U.S.C. 154(b) by 564 days.

(21) Appl. No.: 14/457,116

(22) Filed: Aug. 12, 2014

(65) Prior Publication Data
US 2015/0062542 A1 Mar. 5, 2015

Related U.S. Application Data
(60) Provisional application No. 61/874,079, filed on Sep. 5, 2013.

(51) Int. Cl.
H04N 9/31 (2006.01)
G03B 21/14 (2006.01)

(52) U.S. Cl.
CPC ......... H04N 9/3185 (2013.01); G03B 21/147 (2013.01); H04N 9/3173 (2013.01); H04N 9/3194 (2013.01)

(58) Field of Classification Search
CPC ...... G03B 21/00; G03B 21/14; G03B 21/147; G03B 21/142; H04N 9/3185;
(Continued)

(56) References Cited

U.S. PATENT DOCUMENTS 6,753,907 B1 * 6/2004 Sukthankar .......... H04N 5/7408
348/190
7,517,089 B2 * 4/2009 Matsuda ........................ 353/69
(Continued)

OTHER PUBLICATIONS

Vivienne Sze et al, "Opportunistic Structured Light", U.S. Appl. No. 14/185,562, filed Feb. 20, 2014, pp. 1-20.
(Continued)

Primary Examiner — Bao-Luan Q Le
Assistant Examiner — Christopher A Lamb, II
(74) Attorney, Agent, or Firm — Carl G. Peterson; Frank D. Cimino

(57) ABSTRACT

A method for automatic keystone correction in a projection system is provided that includes rectifying a first image to be projected using current keystone correction parameters to generate a first rectified image, projecting, by a projector in the projection system, the first rectified image on a projection surface, determining whether or not current keystone correction parameters are providing sufficient keystone correction after the first rectified image is projected, rectifying a second image to be projected using the current keystone correction parameters to generate a second rectified image if the current keystone correction parameters are providing sufficient keystone correction, computing new keystone correction parameters if the current keystone correction parameters are not providing sufficient keystone correction and rectifying the second image to be projected using the new keystone correction parameters to generate the second rectified image, and projecting, by the projector, the second rectified image on the projection surface.

8 Claims, 5 Drawing Sheets

(58) Field of Classification Search
CPC ...... H04N 9/3194; H04N 9/3197; H04N 5/74; H04N 9/3173; H04N 9/00–898; H04N 9/31–3197
USPC ....... 353/69, 70, 94, 121; 348/745, 746, 747
See application file for complete search history.

(56) References Cited

U.S. PATENT DOCUMENTS

| | | | | |
|---|---|---|---|---|
| 2003/0043303 | A1* | 3/2003 | Karuta | H04N 9/3185 348/744 |
| 2007/0097328 | A1 | 5/2007 | Li et al. | |
| 2008/0259289 | A1* | 10/2008 | Nozaki et al. | 353/70 |
| 2009/0190046 | A1* | 7/2009 | Kreiner | H04N 9/3182 348/789 |
| 2010/0315601 | A1* | 12/2010 | Furui | 353/70 |
| 2011/0181846 | A1* | 7/2011 | Ozawa | H04N 9/3185 353/70 |
| 2012/0062855 | A1* | 3/2012 | Todoroki | H04N 9/3185 353/69 |
| 2012/0105813 | A1* | 5/2012 | Todoroki | H04N 9/3194 353/69 |
| 2013/0229396 | A1* | 9/2013 | Huebner | H04N 9/3147 345/207 |
| 2015/0187057 | A1* | 7/2015 | Kobayashi | H04N 9/3194 345/647 |

OTHER PUBLICATIONS

Ramesh Raskar et al, "iLamps: Geometrically Aware and Self-Configuring Projectors", ACM SIGGRAPH 2003 Conference Proceedings, Jul. 27-31, 2003, San Diego, CA, pp. 809-818.

Ramesh Raskar and Paul Beardsley, "A Self-Correcting Projector", IEEE Computer Vision and Pattern Recognition (CVPR) 2001, vol. 2, Hawaii, Dec. 2001, pp. 504-508.

Rahul Sukthankar et al, "Automatic Keystone Correction for Camera-Assisted Presentation Interfaces", Proceedings of International Conference on Multimedia Interfaces, Oct. 2000, pp. 1-9.

Weipeng Xu et al, "Real-Time Keystone Correction for Hand-Held Projectors with an RGBD Camera", 2013 IEEE International Conference on Image Processing, Sep. 15-18, 2013, Melbourne, Australia, pp. 3142-3145.

Zhaorong Li et al, "A Method for Movable Projector Keystone Correction", Journal of Latex Class Files, vol. 6, No. 1, Jan. 2007, pp. 1-5.

Wun-Yi Lee and Tsorng-Lin Chia, "Low-Cost Smart Projector for Home Entertaiment", Journal of Information Science and Engineering, vol. 26, Jan. 2010, pp. 1637-1655.

Devvrat Yadav and Shashikant Agrawal, "Keystone Error Correction Method in Camera-Projector System to Correct the Projected Image on Planar Surface and Tilted Projector, International Journal of Computer Science & Engineering Technology", vol. 4, No. 2, Feb. 2013, pp. 142-146.

"Using the DLP Pico 2.0 Kit for Structured Light Applications", Texas Instruments Incorporated, Application Report, DLPA021A, Jan. 2010, Revised Oct. 2011, pp. 1-21.

Rahul Sukthankar et al, "Smarter Presentations: Exploiting Homography in Camera-Projector Systems", Proceedings of International Conference on Computer Vision, Jul. 1-14, 2001, pp. 1-7.

Daniel Moreno and Gabriel Taubin, "Simple, Accurate, and Robust Projector-Camera Calibration", Second International Conference on 3D Imaging, Modeling, Processing, Visualization and Transmission (3DIMPT), Oct. 13-15, 2012, Zurich, Switzerland, pp. 464-471.

Song Zhang and Peisen S. Huang, "Novel Method for Structured Light System Calibration", Optical Engineering, vol. 45, Issue 8, Aug. 2006, pp. 1-8.

Zhengyou Zhang, "A Flexible New Technique for Camera Calibration", IEEE Transactions on Pattern Analysis and Machine Intelligence, vol. 22, No. 11, Nov. 2000, pp. 1330-1334.

* cited by examiner

AUTOMATIC KEYSTONE CORRECTION IN A PROJECTION SYSTEM

CROSS-REFERENCE TO RELATED APPLICATIONS

This application claims benefit of U.S. Provisional Patent Application Ser. No. 61/874,079, filed Sep. 5, 2013, which is incorporated by reference herein in its entirety.

BACKGROUND OF THE INVENTION

1. Field of the Invention

Embodiments of the present invention generally relate to automatic keystone correction in a projection system.

2. Description of the Related Art

Hand-held projectors, such as the DLP (Digital Light Processing) Pico Projector available from Texas Instruments, are gaining in popularity as such projectors are increasingly becoming available in light-weight portable consumer electronic devices such as smart phones and cameras. The projector on these devices may be used as a display mechanism to project digital content onto any suitable surface.

In such hand-held projectors, the position and orientation of the projector may change during projection. For example, perspective distortion of the display images may result when the projector is not held perfectly perpendicular to the projection surface. This distortion is sometimes referred to as keystone distortion. Such projectors may require manual intervention to correct for the keystone distortion of the projected images. Further, this correction may be needed each time the relative orientation of the projector to the projection surface changes.

SUMMARY

Embodiments of the present invention relate to methods, apparatus, and computer readable media for automatic keystone correction in a projection system. In one aspect, a method for automatic keystone correction in a projection system is provided that includes rectifying a first image to be projected using current keystone correction parameters to generate a first rectified image, projecting, by a projector in the projection system, the first rectified image on a projection surface, determining whether or not current keystone correction parameters are providing sufficient keystone correction after the first rectified image is projected, rectifying a second image to be projected using the current keystone correction parameters to generate a second rectified image if the current keystone correction parameters are providing sufficient keystone correction, computing new keystone correction parameters if the current keystone correction parameters are not providing sufficient keystone correction and rectifying the second image to be projected using the new keystone correction parameters to generate the second rectified image, and projecting, by the projector, the second rectified image on the projection surface.

In one aspect, a projection system configured to perform automatic keystone correction is provided that includes a projector, at least one processor, and a computer readable medium storing software instructions that when executed by the at least one processor cause the automatic keystone correction to be performed. The automatic keystone correction includes rectifying a first image to be projected using current keystone correction parameters to generate a first rectified image, projecting, by the projector, the first rectified image on a projection surface, determining whether or not current keystone correction parameters are providing sufficient keystone correction after the first rectified image is projected, rectifying a second image to be projected using the current keystone correction parameters to generate a second rectified image if the current keystone correction parameters are providing sufficient keystone correction, computing new keystone correction parameters if the current keystone correction parameters are not providing sufficient keystone correction and rectifying the second image to be projected using the new keystone correction parameters to generate the second rectified image, and projecting, by the projector, the second rectified image on the projection surface.

In one aspect, a method for automatic keystone correction in a projection system including a projector and a camera is provided that includes rectifying a first image to be projected using current keystone correction parameters to generate a first rectified image, projecting, by the projector, the first rectified image on a projection surface, capturing, by the camera, a first image of the first rectified image as projected on the projection surface, rectifying a second image to be projected using current keystone correction parameters to generate a second rectified image, projecting, by the projector, the second rectified image on a projection surface, capturing, by the camera, a second image of the second rectified image as projected on the projection surface, determining whether or not current keystone correction parameters are providing sufficient keystone correction by comparing the first image of the first rectified image to the second image of the second rectified image, rectifying a third image to be projected using the current keystone correction parameters to generate a third rectified image if the current keystone correction parameters are providing sufficient keystone correction, computing new keystone correction parameters if the current keystone correction parameters are not providing sufficient keystone correction and rectifying the third image to be projected using the new keystone correction parameters to generate the third rectified image, and projecting, by the projector, the third rectified image on the projection surface.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
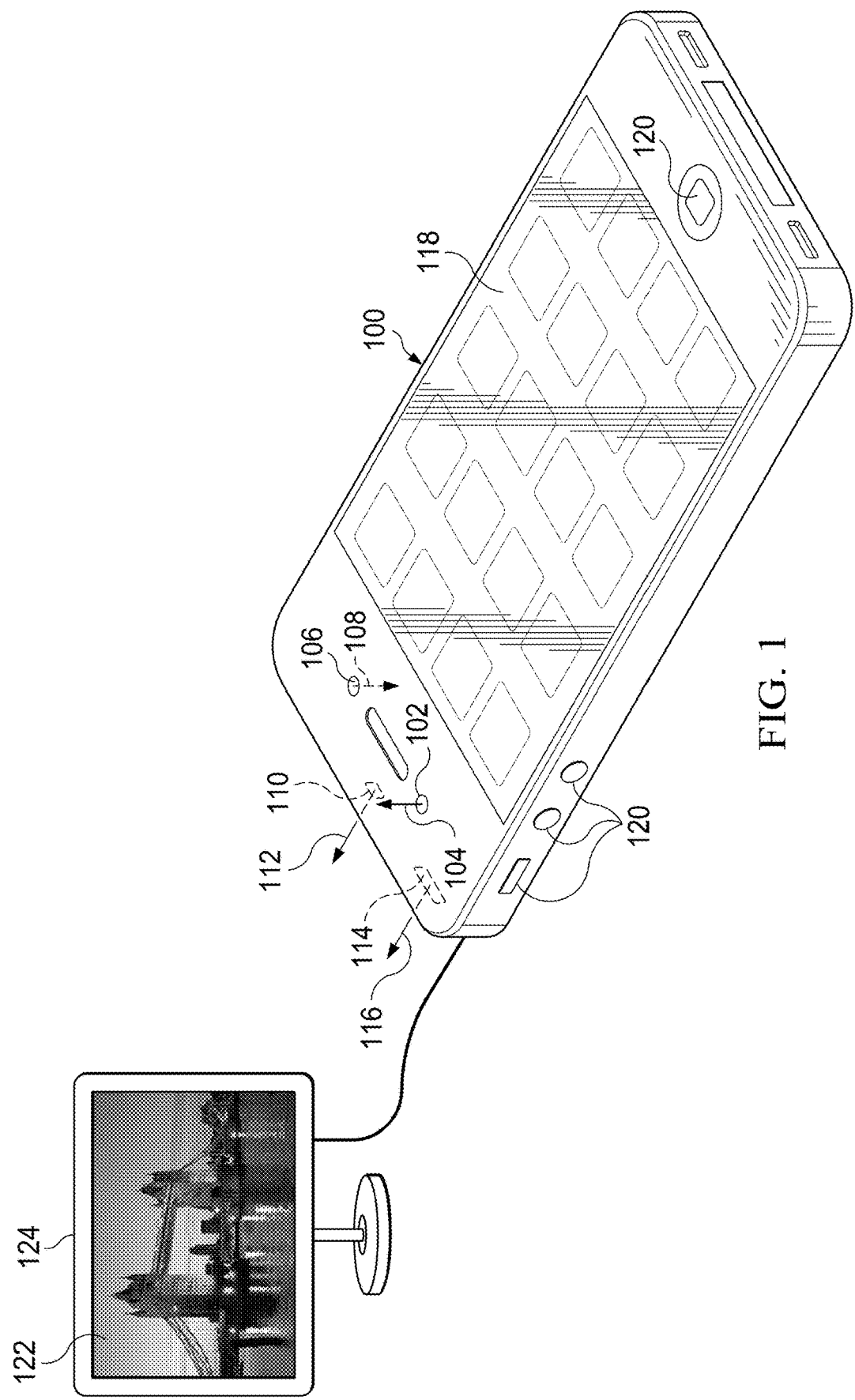
FIG. 1 is a perspective view of an example handheld projection system configured to perform automatic keystone correction.

Specific embodiments of the invention will now be described in detail with reference to the accompanying figures. Like elements in the various figures are denoted by like reference numerals for consistency.

As previously mentioned, keystone distortion of projected image may occur when a handheld projector is not held perfectly perpendicular to the projection surface. A telltale artifact of keystone distortion is that a rectangle in the projector plane appears as a non-right-angled quadrilateral on the projection surface. In the prior art, keystone correction may be performed by manually moving the projector until the distortion is corrected, which is a drawback in using handheld projectors.

Embodiments of the invention provide for automatic keystone correction in a projection system as images are being projected. To perform automatic keystone correction, initial keystone correction parameters based on a depth image of the projection surface may be generated (or may be otherwise available) when the projection system is activated. These initial parameters are applied to each image to be projected to pre-warp the image prior to projection, and the efficacy of the keystone correction is monitored for each projected image. If a determination is made that that the parameters need to be changed because the current parameters no longer provide sufficient keystone correction, e.g., the projector and/or the projection surface have moved, new keystone correction parameters are computed based on a new depth image of the projection surface and the new parameters are used to pre-warp projected images going forward. The pre-warping for keystone correction, monitoring, and possible re-computation of keystone correction parameters continue while the projection system is in use.

FIG. 1 is a perspective view of an example handheld projection system 100 configured to perform automatic keystone correction as a video stream is being projected. More specifically, the handheld projection system 100 is configured to execute an embodiment of a method for automatic keystone correction as described herein. In this example, the handheld projection system 100 is embodied in a mobile smart phone. As shown in FIG. 1, the handheld projection system 100 includes a front-facing camera 102 (on the front of the system 100) that points in the direction indicated by arrow 104, a rear-facing camera 106 (on the back of the system 100) that points in the direction indicated by arrow 108 (substantially opposite the direction of arrow 104), and a top-facing camera 110 (on the top edge of the system 100) that points in the direction of arrow 112 (substantially orthogonal to the directions of arrows 104 and 108). In some embodiments, one or both of the front-facing camera 102 and the rear-facing camera 106 may not be present.

The handheld projection system 100 also includes a projector 114 (on the top edge of the system 100) that points in the direction of arrow 116 (substantially parallel to the direction of arrow 112). The projector 114 is configured to project a video stream 122 onto a projection surface 124 under the control of the system 100. The projector 114 is also configured to project structured light patterns onto the projection surface 124 under the control of the system 100 during the projection of the video stream 122. In some embodiments, the projector 114 is a light projector (e.g., pico projector) that is suitable for projecting a video stream 122 onto a projection surface 124 under control of the system 100. An example of one suitable light projector is a DLP (Digital Light Processing) Pico Projector available from Texas Instruments, Inc. The use of a DLP pico projector to project structured light patterns is well known. For example, use of a DLP pico projector for structured light applications is described in the Texas Instruments application report "Using the DLP Pico 2.0 Kit for Structured Light Applications", DLPA021A, January 2010 (revised October 2011), available at www.ti.com/lit/an/dlpa021a/dlpa021a.pdf.

The top-facing camera 110 is configured to have a field of view (FOV) that substantially overlaps the FOV of the projector 114 such that the camera 110 can capture images of video frames and structured light patterns being projected on the projection surface 124.

The handheld projection system 100 also includes a touch screen 118 (on the front of the system 100) and various buttons 120 for manually controlling operations of the system 100.

Figure 2:
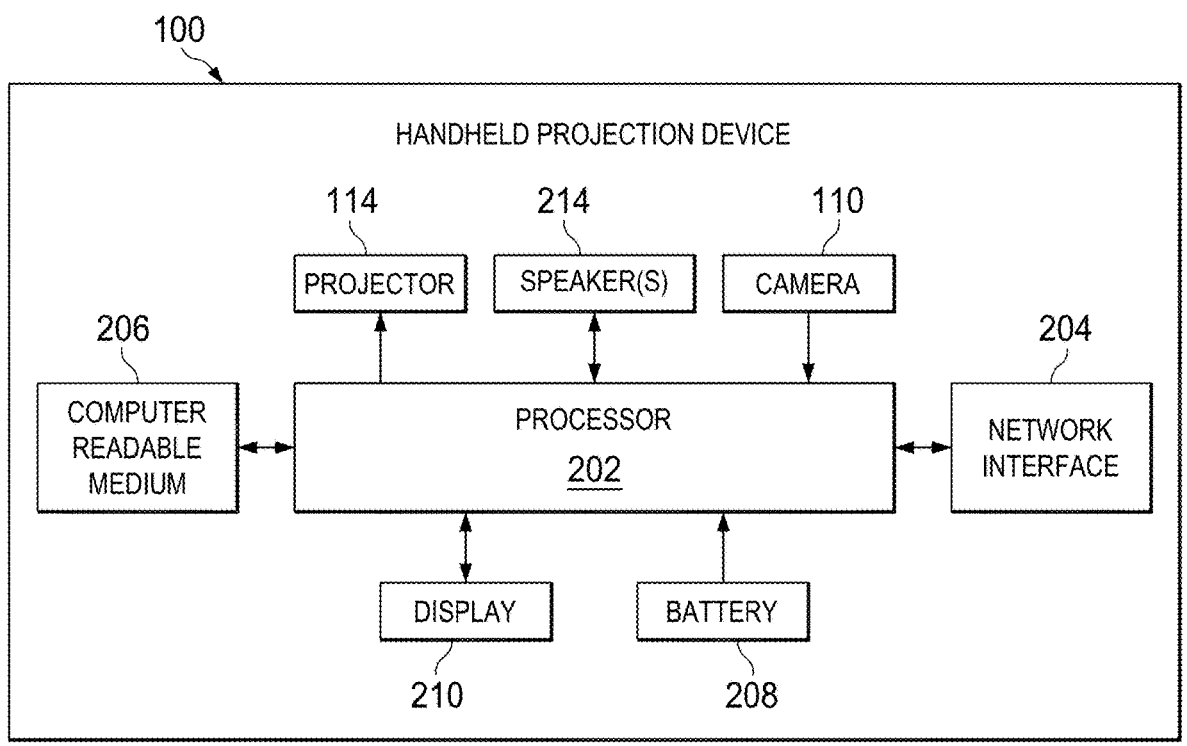
FIG. 2 is a block diagram of the handheld projection system of FIG. 1.

FIG. 2 is a block diagram of the handheld projection system 100. The system 100 includes various electronic circuitry components for performing system operations implemented in a suitable combination of software, firmware and hardware. Such components include a processor 202 (e.g., one or more microprocessors and/or digital signal processors) for executing software instructions that implement at least some system operations, a network interface 204 for communicating information to and from a network in response to signals from the processor 202, and a computer-readable medium 206, such as a nonvolatile storage system and/or a random access memory ("RAM") system, for storing software instructions programs and other information. The system 100 also includes a battery 208 providing power for the system 100, a display 210 that includes a screen for displaying information to a user and for receiving information from the user in response to signals from the processor 202, and speaker(s) 214 for outputting sound waves in response to signals from the processor 202. For simplicity, the other cameras of system 100 are not shown.

As shown in FIG. 2, the processor 202 is connected to the computer-readable medium 206, the battery 208, and the display 210, the speaker 214, the projector 114 and the camera 110. For clarity, although FIG. 2 shows the battery 208 connected to only the processor 202, the battery 208 may be further coupled to various other components of the system 100. Also, the processor 202 is coupled through the network interface 204 to a network (not specifically shown), such as the Internet or an intranet. For example, the network interface unit 204 communicates information by outputting information to, and receiving information from, the processor 202 and the network, such as by transferring information (e.g., instructions, data, signals) between the processor 202 and the network (e.g., wirelessly or through a USB interface).

In response to executing software instructions stored in the computer readable medium 206, the processor 202 causes the projector 114 to project the video stream 122 on the projection surface 124. Further, in response to executing software instructions stored in the computer readable medium 206, the processor 114 causes an embodiment of the method of FIG. 3 to be executed to automatically perform keystone correction on projected frames of the video stream. As part of executing the method, the processor 114 causes the camera 110 to capture an image of each projected video frame. The processor 202 also, as needed for the automatic keystone correction, causes the projector 114 to project a structured light pattern on the projection surface 124 and causes the camera 110 to capture an image of the projected structured light pattern when projected. The use of the captured images of the projected video frames and the captured images of the structured light pattern is explained in reference to FIG. 3.

Figure 3:
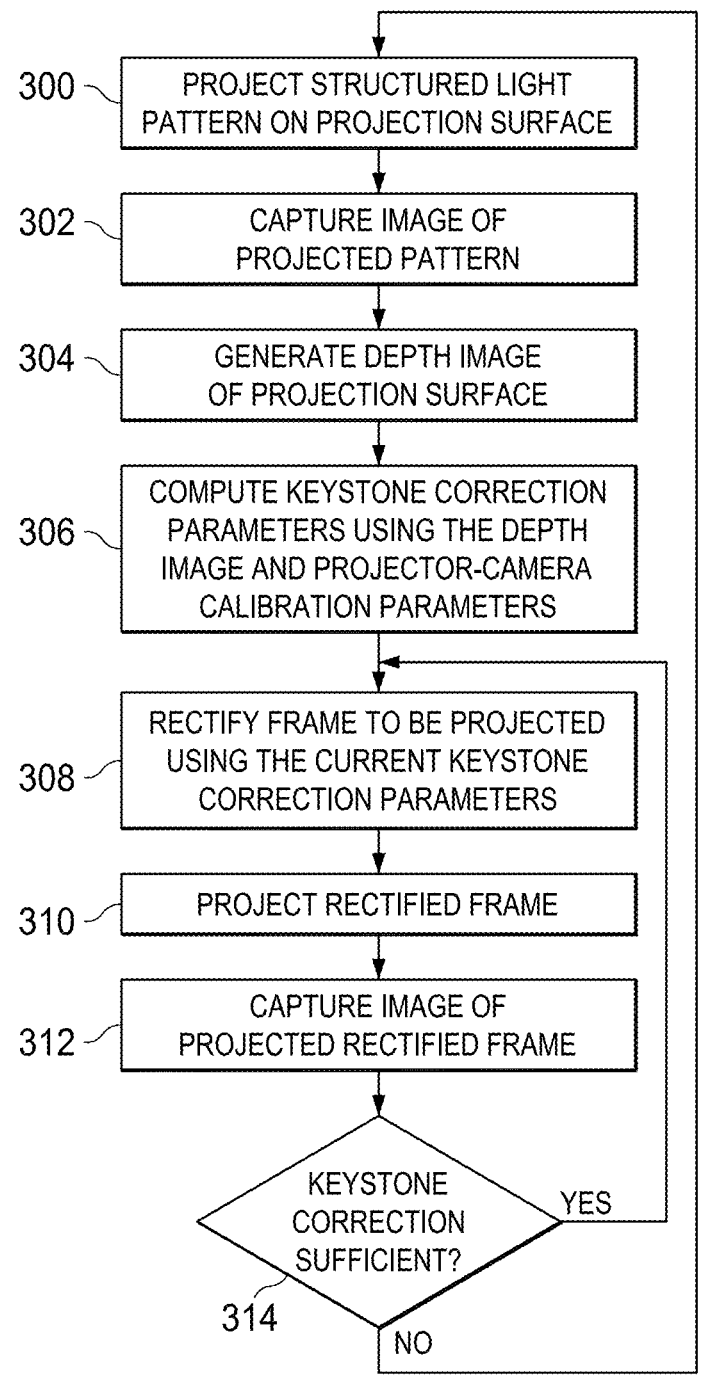
FIG. 3 is flow diagram of a method for automatic keystone correction that may be executed by the handheld projection system of FIGS. 1 and 2.

FIG. 3 is a flow diagram of a method for automatic keystone correction in a projection system including a camera that may be performed, for example, in the handheld projection system 100 of FIGS. 1 and 2. This method may be executed continuously as the video stream 122 is projected on the projection surface 124, and operates on each frame of the video stream 122. The method assumes that a projector-camera calibration matrix, i.e., a set of calibration parameters, is available. The calibration may be done offline and the parameters stored in the projection system. Techniques for projector-camera calibration are well-known and any suitable technique may be used. Examples of some suitable camera and/or projector calibration techniques may be found in S. Zhang and P. S. Huang, "Novel Method for Structured Light System Calibration," Optical Engineering, Vol. 45, No. 8, pp. 083601-1-083601-8, August, 2006, and Z. Zhang, "A Flexible New Technique for Camera Calibration," IEEE Transactions on Pattern Analysis and Machine Intelligence, Vol. 22, No. 11, pp. 1330-1334, November, 2000.

As shown in FIG. 3, keystone correction parameters, i.e., a 3×3 transformation matrix that maps coordinates of an image to keystone corrected coordinates, are initially determined using a depth image of the projection surface and the projector-camera calibration parameters. More specifically, a structured light pattern is projected 300 on the projection surface by the projector in the projection system, an image of the projected pattern is captured 302 by the camera, and a depth image of the projection surface is generated 304 using the captured image and the projected pattern. Any suitable structured light pattern, e.g., a single fixed pattern with random dots, and technique for structured light depth image computation may be used that provides real-time performance.

Keystone correction parameters are then computed 306 using the depth image and the projector-camera calibration parameters. Computation of keystone correction parameters using depth information and projector-camera calibration parameters is well-known and any suitable technique providing real-time performance may be used. An example of one such technique may be found in R. Raskar and P. Beardsley, "A Self-Correcting Projector," 2001 IEEE Computer Vision and Pattern Recognition, pp. 504-508, December 2001 ("Raskar herein"). An example technique for computing keystone correction parameters that may be used is now described in reference to the examples of FIGS. 4, 5, and 6.

Figures 4, 5:
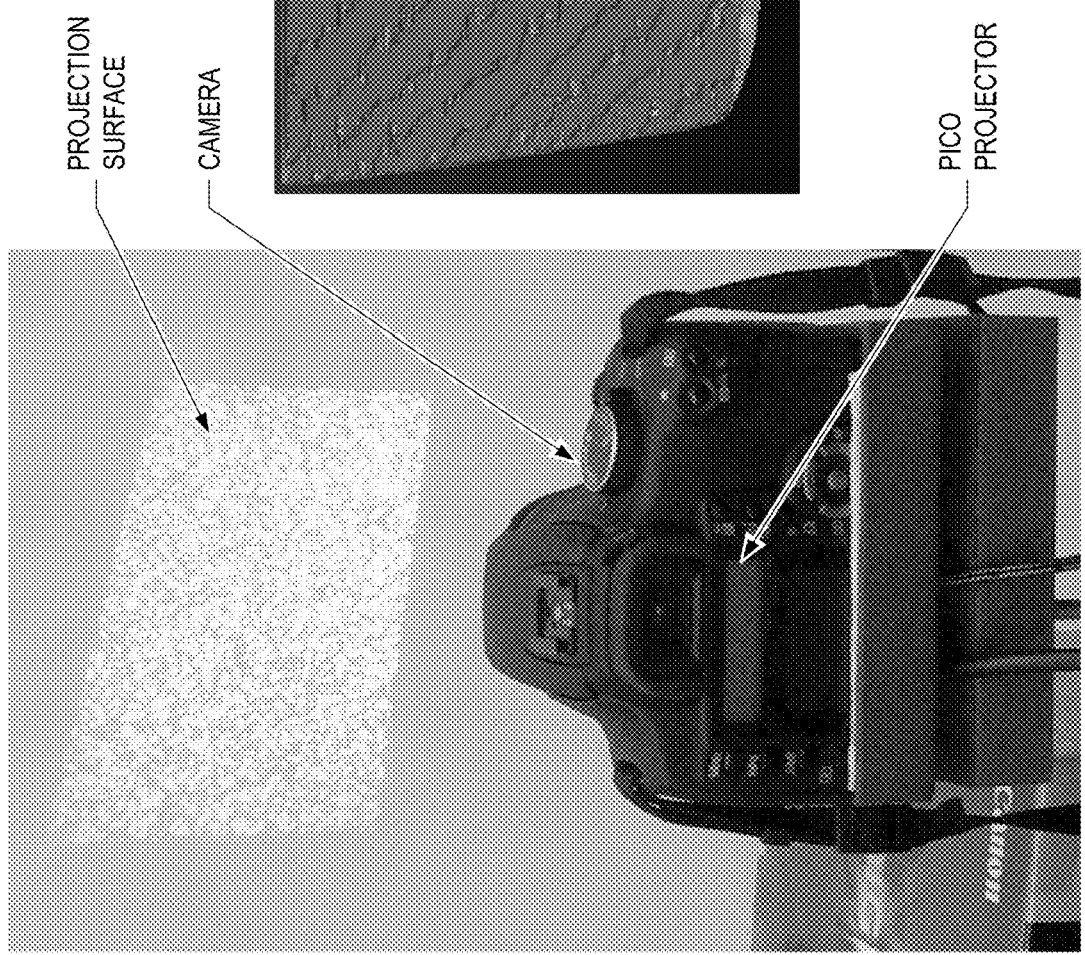
FIGS. 4, 5, and 6 are examples.

FIG. 4 illustrates an experimental camera projector pair positioned such that the projector is not perpendicular to the projection surface. In this example, a pico projector and an RGB camera are used. The figure further illustrates an example structured light pattern projected on the projection surface. Because the projector is not perpendicular to the projection surface, the projected pattern shows keystone artifacts. The camera was used to capture an image of the projected pattern and a depth image was generated. The depth image is shown in FIG. 5.

Figure 6:
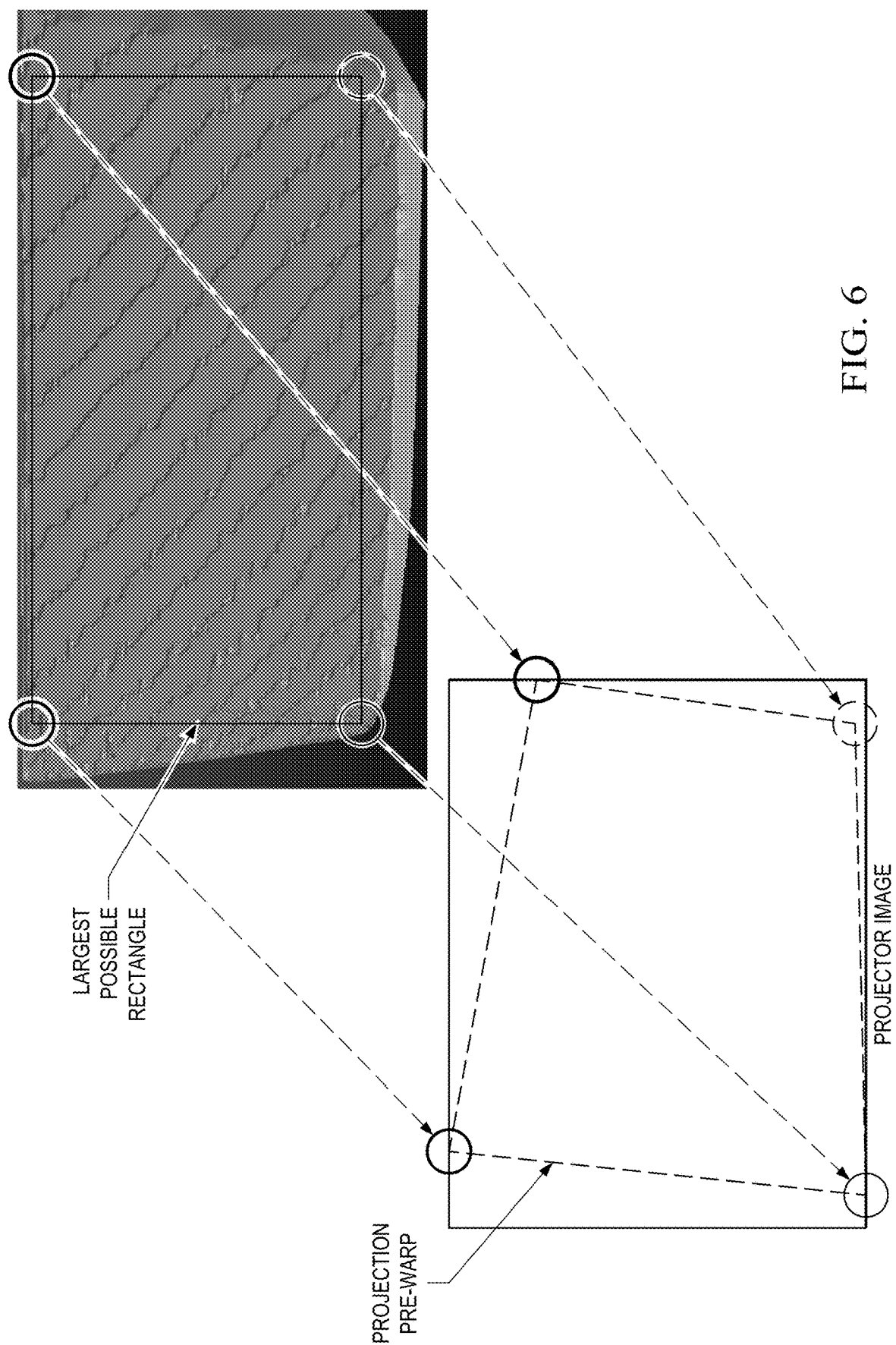

To generate the keystone correction parameters, first the largest possible rectangle that fits inside the two-dimensional (2D) coordinates of the 2D quadrilateral formed by the depth image is determined. This rectangle may be determined, for example, by starting with a small rectangle, and incrementally increasing the coordinates of each corner until the coordinates of a corner of the rectangle are outside of a boundary of the quadrilateral. Other techniques for finding the largest rectangle suitable for real-time execution may also be used. One such technique is described in D. Yadav and S. Agrawal, "Keystone Error correction Method in Camera-Projector System to Correct the Projected Image on Planar Surface and Tilted Projector," International Journal of Computer Science & Engineering Technology, Vol. 4, No. 02, February, 2013, pp. 142-146. FIG. 6 illustrates the largest possible rectangle found for the depth image of FIG. 5.

Once the rectangle is determined, points in the projector image corresponding to the four corner points of the rectangle are identified by applying the projector-camera calibration parameters to the four corner points. As illustrated in FIG. 6, the corresponding points in the projector image form a quadrilateral. These corresponding points are then used to generate keystone correction parameters that will warp a rectangular image to be projected into the quadrilateral formed by the corresponding points. More specifically, the values of a 3×3 transformation matrix for a non-rigid image transform are estimated based on these corresponding points. Techniques for generating such a transformation matrix are well-known and any technique suitable for real-time processing may be used. One such technique is described in Raskar. The process of finding the corresponding points in the projection image and generating the keystone correction parameters (the transformation matrix) may be referred to as back-projection of the rectangle.

Referring again to FIG. 3, the current keystone correction parameters are applied to the next frame of the video stream to be projected to rectify 308 (pre-warp) the frame content and the rectified frame is projected 310 on the projection surface by the projector. An image of the projected rectified frame is then captured 312 by the camera. This image is then used to determine 314 if the current keystone correction is sufficient. To determine if the current keystone correction is sufficient, the current captured image is compared to the previously captured rectified frame image. Note that for the first iteration, there will be no previously captured image and the current keystone correction will be found to be sufficient. The efficacy of the current keystone correction may be determined, for example, by comparing the brightness of the current image to the brightness of the previously captured image. Such a comparison may be made, for example, by taking an absolute difference of the current captured image and the previously captured image. If the overall brightness (amplitude) of the difference image increases above a predetermined threshold, the current keystone correction is determined to be insufficient. If the current keystone correction is determined 314 to be sufficient, the method continues at step 308. Otherwise, the method continues at step 300 to compute new keystone correction parameters.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein in which the handheld projection system is embodied in a mobile smart phone. One of ordinary skill in the art will understand embodiments in which the handheld projection system is, for example, a standalone projection system that includes a camera for capturing images of the projected video frames and structured light patterns. One of ordinary skill in the art will also understand embodiments in which the projector is embodied in sleeve or clip-on unit that may physically coupled to a smart phone to form a handheld projection system.

In another example, embodiments have been described herein in which the projector and the camera are placed on the top edge of the handheld projection system. One of ordinary skill in the art will understand embodiments with differing placement of the projector and camera in the projection system. For example, the projector and camera may be placed on the top or bottom of the projection system or on other edges so long as the FOV of the camera substantially overlaps that of the projector.

In another example, embodiments have been described here in which the projected frames are assumed to be from a video stream. One of ordinary skill in the art will understand embodiments in which the projected frames are individual frames or images, e.g., slides in a presentation.

In another example, embodiments have been described herein assuming a handheld projection system. One of ordinary skill in the art will understand embodiments in which the projection system is not a handheld system.

In another example, embodiments have been described herein in which the keystone correction parameters are assumed to be a transformation matrix for a non-rigid transform. One of ordinary skill in the art will understand embodiments in which the transformation matrix is for an affine transform.

In another example, embodiments have been described herein in which structured light imaging is used to generate the keystone correction parameters. One of ordinary skill in the art will understand embodiments in which depth sensors, e.g., a time-of-flight sensor or an infrared structured light sensor, may be used in lieu of the described structured light imaging. In some such embodiments, rather than capturing images of the rectified projected frames to check the efficacy of the current keystone correction parameters, a depth image may be generated by the depth sensor after a rectified frame is projected and this new depth image compared to the depth image used to generate the current keystone correction parameters to determine the efficacy of the current parameters. If the current parameters are determined to be insufficient, the current depth image may be used to generate new keystone correction parameters.

Embodiments of the method described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method for automatic keystone correction in a projection system, the method comprising:
    computing, by the projection system, a depth image of a projection surface based on a captured image and a projected pattern, wherein the depth image forms a two-dimensional quadrilateral;
    computing, by the projection system, current keystone correction parameters by determining a rectangle inside the two-dimensional quadrilateral and applying calibration parameters to the rectangle to identify points on the depth image;
    rectifying, by the projection system, a first image using the current keystone correction parameters to generate a first rectified image;
    projecting, by a projector comprised in the projection system, the first rectified image on the projection surface;
    determining, by the projection system, a first image value associated with the first rectified image;
    rectifying, by the projection system, a second image using the current keystone correction parameters to generate a second rectified image;
    projecting, by the projector, the second rectified image on the projection surface;
    determining, by the projection system, a second image value associated with the second rectified image; and
    determining, by the projection system, a correction level of the current keystone correction parameters based on the first image value and the second image value.

2. The method of claim 1, further comprising:
    in response to the correction level exceeding a threshold, computing new keystone correction parameters based on the second rectified image.

3. The method of claim 1, further comprising:
    in response to the correction level below a threshold, rectifying, by the projection system, a third image using the current keystone correction parameters to generate a third rectified image; and
    projecting, by the projector, the third rectified image on the projection surface.

4. A projection system configured to perform automatic keystone correction, the projection system comprising:
    a projector;
    at least one processor; and
    a computer readable medium storing software instructions that when executed by the at least one processor cause the automatic keystone correction to be performed, the automatic keystone correction comprising:
        computing a depth image of a projection surface based on a captured image and a projected pattern, wherein the depth image forms a two- dimensional quadrilateral;
        computing current keystone correction parameters by determining a rectangle inside the two-dimensional quadrilateral and applying calibration parameters to the rectangle to identify points on the depth image;
        rectifying a first image using the current keystone correction parameters to generate a first rectified image;
        projecting, by the projector, the first rectified image on the projection surface;
        determining a first image value associated with the first rectified image;
        rectifying a second image using the current keystone correction parameters to generate a second rectified image;
        projecting, by the projector, the second rectified image on the projection surface;
        determining a second image value associated with the second rectified image; and determining a correction level of the current keystone correction parameters based on the first image value and the second image value.

5. The projection system of claim 4, wherein the automatic keystone correction further comprises:
in response to the correction level exceeding a threshold, computing new keystone correction parameters based on the second rectified image.

6. The projection system of claim 4, wherein the automatic keystone correction further comprises:
in response to the correction level below a threshold, rectifying, by the projection system, a third image using the current keystone correction parameters to generate a third rectified image; and
projecting, by the projector, the third rectified image on the projection surface.

7. A method for automatic keystone correction in a projection system comprising a projector and a camera, the method comprising:
computing a depth image of the projection surface based on a captured image and a projected pattern, wherein the depth image forms a two-dimensional quadrilateral;
computing current keystone correction parameters by determining a rectangle inside the two-dimensional quadrilateral and applying calibration parameters to the rectangle to identify points on the depth image;
rectifying a first image using the current keystone correction parameters to generate a first rectified image;
projecting, by the projector, the first rectified image on the projection surface;
capturing, by the camera, a first image of the first rectified image as projected on the projection surface;
rectifying a second image using the current keystone correction parameters to generate a second rectified image;
projecting, by the projector, the second rectified image on the projection surface;
capturing, by the camera, a second image of the second rectified image as projected on the projection surface;
determining a correction level by comparing a first image value associated with the first image of the first rectified image to a second image value associated with the second image of the second rectified image;
rectifying a third image to be projected using the current keystone correction parameters to generate a third rectified image in response to the correction level at or within a threshold; and
projecting, by the projector, the third rectified image on the projection surface.

8. The method of claim 7, further comprising:
in response to the correction level exceeding the threshold:
computing new keystone correction parameters; and
rectifying the third image using the new keystone correction parameters to generate the third rectified image.

* * * * *